United States Patent
Bacher et al.

(10) Patent No.: US 7,792,251 B2
(45) Date of Patent: Sep. 7, 2010

(54) METHOD FOR THE CORRECTION OF LAG CHARGE IN A FLAT-PANEL X-RAY DETECTOR

(75) Inventors: Guillaume Bacher, Voiron (FR); Mylene Roussel, Saint Germian (FR); Benjamin Didier Rene Wimille, Versailles (FR); Mathieu Seval, Villepreux (FR); Julien Georges Heyman, Buc (FR)

(73) Assignee: General Electric Company, Schenectady, NY (US)

( * ) Notice: Subject to any disclaimer, the term of this patent is extended or adjusted under 35 U.S.C. 154(b) by 150 days.

(21) Appl. No.: 12/055,085

(22) Filed: Jun. 3, 2008

(65) Prior Publication Data

US 2008/0240366 A1  Oct. 2, 2008

(30) Foreign Application Priority Data

Mar. 27, 2007   (FR) .................................. 07 54068

(51) Int. Cl.
   *A61B 6/00*  (2006.01)
(52) U.S. Cl. .................................. 378/98.12
(58) Field of Classification Search ................. 378/98.7, 378/98.8, 98.11, 98.12, 207
   See application file for complete search history.

(56) References Cited

U.S. PATENT DOCUMENTS

| | | | | |
|---|---|---|---|---|
| 4,393,402 A | * | 7/1983 | Keyes et al. | 378/98.11 |
| 5,452,338 A | | 9/1995 | Granfors et al. | |
| 5,923,722 A | | 7/1999 | Schulz | |
| 2004/0022352 A1 | * | 2/2004 | Suzuki | 378/19 |
| 2004/0096036 A1 | | 5/2004 | Yanoff et al. | |
| 2004/0202281 A1 | * | 10/2004 | Colbeth et al. | 378/98.8 |
| 2007/0140427 A1 | * | 6/2007 | Jensen et al. | 378/98.12 |

FOREIGN PATENT DOCUMENTS

DE   196 31 624 C1   10/1997

* cited by examiner

*Primary Examiner*—Chih-Cheng G Kao
(74) *Attorney, Agent, or Firm*—Global Patent Operation

(57) ABSTRACT

A method for the correction of lag charges in a flat-panel X-ray detector makes it possible, for each integration phase of the detector, to determine an initial read phase situated just before said integration phase. The method of the invention enables the measurement, for each integration phase, of the charges present in the detector at the corresponding initial read phase, the production of a lag image from the latent charges measured in the initial read phase and the subtraction of the lag image from the raw image. The use of the measurement of charges enables the direct correction of the lag image in the acquisition without the use of a correction module as in the prior art.

7 Claims, 2 Drawing Sheets

METHOD FOR THE CORRECTION OF LAG CHARGE IN A FLAT-PANEL X-RAY DETECTOR

CROSS-REFERENCE TO RELATED APPLICATIONS

This application claims the right of priority, under 35 USC 119(a)-(d), to the earlier filing date of co-pending French patent application serial number: 0754068, filed 27 Mar. 2007. The basis for this claim of priority is France's membership in the World Trade Organization.

BACKGROUND

1. Field of the Invention

Embodiments of the present invention finds particularly advantageous but not exclusive application in the field of medical imaging and medical diagnostic apparatuses. These diagnostic apparatuses are X-ray image acquisition apparatuses. The Embodiments of the invention can nevertheless be applied to any other field in which a correction is undertaken of latent charges in a flat-panel detector.

2. Prior Art

Today, X-ray apparatuses can be used to obtain images, and even image sequences, of an organ situated within a living being, especially a human. An X-ray apparatus comprises an X-ray generator tube and an X-ray detector. The X-ray detector is a large flat-panel detector. This detector has a detector plate comprising photodiodes used to detect electromagnetic radiation, namely the X-rays. This detector plate is covered with a hood or cover. This cover is that element of the detector liable to come into contact with the patient during a radiology examination.

In a radiology examination, the patient is placed between the generator tube and the cover of the detector. An X-ray beam emitted by the generator tube is directed toward the patient.

During the radiology exposure, X-ray photons are absorbed by the patient's body in varying degrees. The rest of the X-ray beam, going through the patient's body, is detected by the detector plate of the detector. The photodiodes of the detector plate create a charge whenever its different points are stimulated by the residual rays. The detector has charge collector electrodes used to collect the charges which are then temporarily stored in capacitors. Under the effect of a control signal, the charges stored are transmitted to different TFT matrices. The signals thus obtained are amplified and then transmitted to the signal processing and image reconstruction computational units of the X-ray apparatus.

The images thus obtained are interpreted by a specialist practitioner in order to perform diagnosis or to assist in surgical operations and/or take action to treat the pathologies detected.

However, this type of X-ray apparatus has drawbacks. Indeed, a second source of residual signals is observed in the course of the acquisitions, thus causing deterioration in the quality of the images obtained with this type of apparatus. This second source of signals results from the history of the illumination of the photodiodes. This is a phenomenon called lag or persistence.

This lag is manifested by the fact that the intensity of the signal associated with a pixel depends on one or more previous exposures to X-rays. This phenomenon of lag is due to the fact that present-day X-ray apparatuses use amorphous silicon detectors. Owing to the nature of the amorphous silicon in the panel detector, the photodiodes contain traps that get filled by excitation from the X-rays and then get emptied by a process of decay with a relatively big time constant. As a result, a decaying image is retained by the detector. The importance of the lag image in the X-ray detectors decreases with time as the traps get emptied by thermal effect so much so that the persistence signal will decrease slowly until it is no longer visible. This decay may last several minutes.

The use of a big flat-panel X-ray detector thus causes problems of lag charges which disturb the images viewed by the practitioner. These latent charges which are visible in the last image acquired can smear said image thus causing errors of diagnosis.

In the case of vascular applications, several radiology images are acquired per second. Owing to the release of the charges trapped in the photodiodes, the previously acquired images disturb the next images that are to be acquired. And when the X-ray apparatus is mobile, the superimposition of the signal given by the latent charges and the correct signal may completely modify the result of the image viewed.

There are now several classic solutions used to resolve the drawbacks due to the trapping of charges in the photodiodes of the detector. One of the main, classic solutions consists in defining a constant error correction module to be applied to the radiology image. However, this approach has drawbacks for it produces optimal results only when the acquisition mode is the same and when the integration time of the detector is constant.

The acquisition mode may be a low-dose mode in which the intensity of the rays emitted by the tube is low and/or a high-dose mode in which the intensity of the X-rays emitted is high. The integration time is the time in which the charges accumulate in the photodiodes.

During a passage made from one acquisition mode to another, the predefined error correction model is no longer suited to resolving a problem of latent charges. This is because the fact that the quantity of latent charge stored is completely different from one mode to another.

Furthermore, in the prior art, the acquisition modes work according to a predefined succession of detector discharge times and integration times. It is not possible to vary the integration time of the detector. However since, in practice, the image acquisition operations have to be done at fixed positions and since the practitioner directs the positioning of the detector, the integration phases of the detector cannot be fixed. They are variable. The integration time lasts for a period of time whose duration varies when compared with the fixed time as defined in the prior art. The predefined error correction code is therefore not better suited to correcting the errors induced by the latent charges with variable integration times.

SUMMARY OF THE INVENTION

Embodiments of the invention aim at overcoming the drawbacks of the above-mentioned techniques. To this end, embodiments of the invention propose a method for the processing of latent charges in a flat-panel X-ray detector. The detector has two states, an integration phase to detect the incoming photons and a read phase to read the pixels and obtain the radiology image. The panel of the detector is synchronized with a clock. The read phase alone which gives the signal is the one situated just after the integration phase. This read phase gives a raw exposure image. The other read phases give dark or lag images.

The method of the invention achieves maximum reduction in the lag effect during radiography operation by the performance of a reading of the detector in the absence of exposure to X-rays. This enables the measurement of the lag at this instant of acquisition. The determined lag measurements may then be used to correct the exposure images in real time. The method of the invention thus enables measurement of the latent charges present in the last read phase before a new integration phase. The latent charges measured are eliminated from the acquired exposure image.

The method of the invention enables real-time correction of the latent charges in the detector in all the images of an acquisition mode. The invention implements an algorithm for measurement of the charges rather than a lag correction model as in the prior art. The algorithm for measurement of latent charges is applied before each integration phase. The use of the measurement algorithm of the invention enables the direct correction of the latent charges in the acquired image without the use of a correction model.

The Embodiments of the invention also include a processing algorithm used to reduce the noise. To reduce the impact on the noise, the algorithm may determine the available of several available read phases situated before an integration phase. This average corresponds to the measurement of the latent charge that has to be eliminated from the acquired image. To reduce the impact on the noise, the processing algorithm can also be applied directly to the acquired image.

BRIEF DESCRIPTION OF THE DRAWINGS

Embodiments of the invention will be understood more clearly from the following description and the accompanying figures. These figures are given by way of an indication and in no way restrict the scope of the invention.

DETAILED DESCRIPTION

Figure 1:
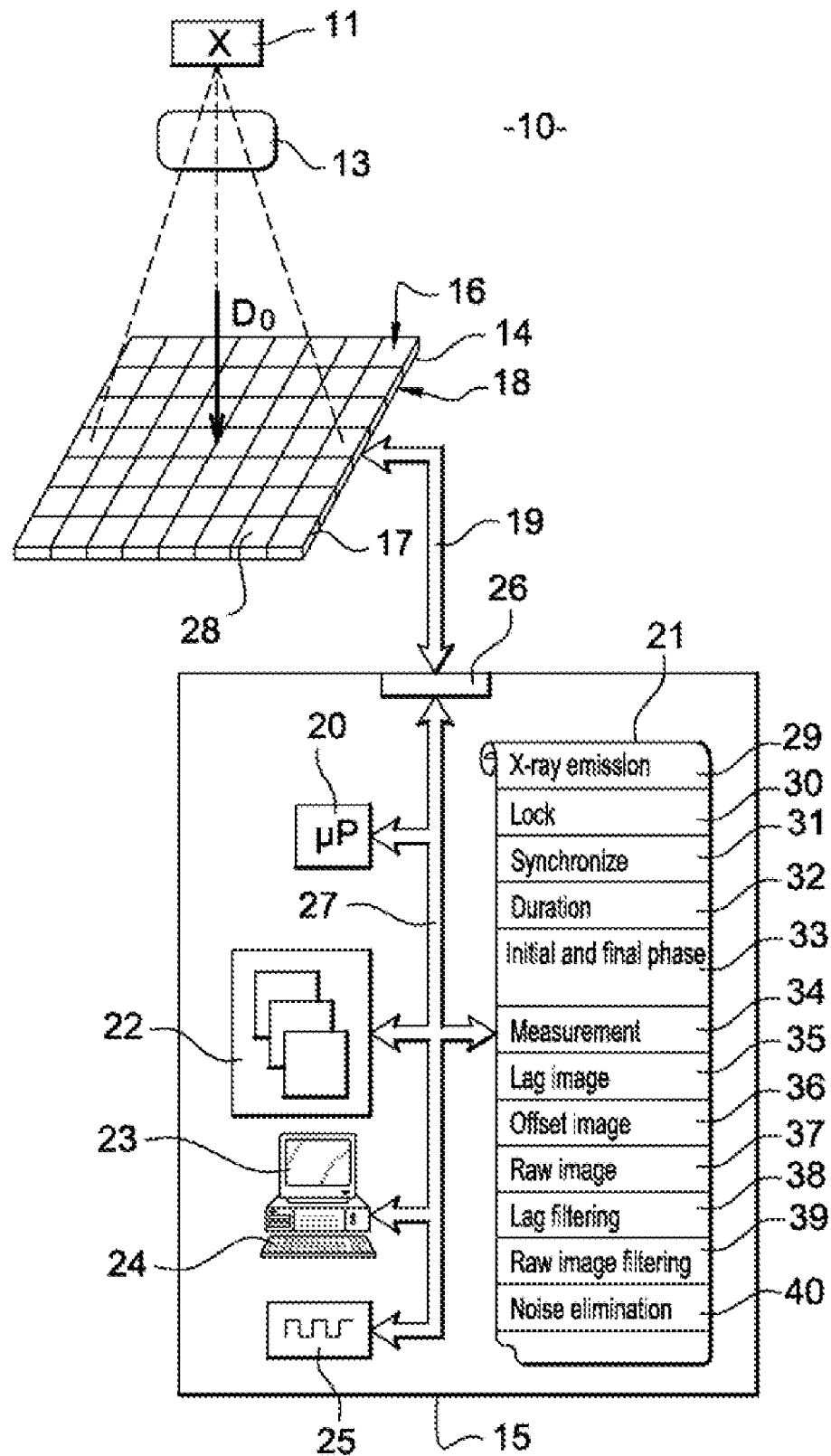
FIG. 1 shows a device for the production of radiology images by means of a detector implementing a method of processing of latent charges according to the invention.

FIG. 1 illustrates a radiology image production apparatus implementing a method of correction of latent charges in a detector, according to the invention.

The images produced by the production apparatus 10 result from the detection of an incident irradiation coming from a radiation source 11, a patient 13 being exposed to this irradiation. The apparatus 10 also has an image detector 14, a control logic unit 15. The detector is a flat panel detector.

The image detector 14 may include a photo-detection surface 16 which is optically coupled to an underlying scintillator 17. The scintillator 17 is positioned so as to receive incident radiation such as X-rays coming from the radiation source 11. Photons generated in the scintillator 17 in response to incident radiation pass through a surface of a photodiode 18 proper, for example based on amorphous silicon, in which the light is detected and corresponding image data signals are generated. The detector 14 is a semiconductor detector generally made out of lithium-doped silicon capable of measuring the energy of each X-ray with high precision.

The incident X-rays thus interact with the scintillator 17 to emit light photons which are absorbed by the photodiodes 18 in causing electron-hole pairs to be created.

For each X-photon captured, the detector 14 generates an electrical impulse with an amplitude proportional to the energy of the photon. The image detector 14 emits electrical signals corresponding to the energy of the rays received. These electrical signals can then be transmitted to the control logic unit 15 by means of an external bus 19. This analog signal is amplified, shaped and then converted into digital value by the control logic unit.

These digital values enable the control logic unit 15 to produce an image corresponding to the part of the body analyzed. These images may be viewed by means of a screen of this control logic unit 15 or they may be printed or memorized.

In one example, the control logic unit 15 comprises a microprocessor 20, a program memory 21, a data memory 22, a display screen 23 provided with a keyboard 24, a clock 25 and an input/output interface 26. The microprocessor 20, the program memory 21, the data memory 22, the display screen 23 provided with a keyboard 24, the clock 25 and the input/output interface 26 are interconnected by an internal bus 27.

The photodiode 18 has a multitude of underlying photodiode pixels 28 laid out in two dimensions, beneath the entire surface of the scintillator 17. The image is thus divided into rows and columns corresponding to a matrix with a size (n×m). The control logic unit 15 enables measurement of a charge created in each pixel of the respective photodiode 18, in response to an incident irradiation. The detector is thus divided into a matrix of discrete picture elements or pixels and encodes output signals as a function of the quantity and intensity of the radiation striking each pixel region.

During the radiology exposure, a dose D0 of radiation is sent by the radiation source 11 to a patient's body. This dose D0 passes through the patient's body and is received by the image detector 3. The image of the dose received by the image detector 14 is converted by the scintillator 17 into a light contrast.

The image received by the detector 14 should be capable of being viewed by a medical practitioner or a specialist in medical imaging. However, after passage through the image detector 14, this image remains a raw, unprocessed image. It comprises artifacts due to the latent charges present in each pixel 28 of the photodiode 18. The control logic unit has means capable of correcting the image.

In practice, when an action is attributed to a device, this action is performed by a microprocessor of the device controlled by instruction codes recorded in a program memory of the device. The control logic 15 is such a device. The control logic unit 15 is often made in integrated circuit form.

The program memory 21 is divided into several zones, each zone corresponding to instruction codes to perform one function of the device. Depending on the variants of the invention, the memory 21 has a zone 29 comprising instruction codes to determine the different X-ray emission positions of the tube, as a function of the radiology examination to be undertaken. The memory 21 has a zone 30 comprising instruction codes to lock the integration phases of the detector into the X-ray emission positions of the tube.

The memory 21 has a zone 31 comprising instruction codes to synchronize read and integration phases of the detector with the clock signal 14. This clock signal 14 may be the clock signal of the microprocessor 20. The memory 21 has a zone 32 comprising instruction codes to determine the duration of the integration phases as a function of the correction rate to be determined for the image to be acquired.

The memory 21 has a zone 33 comprising instruction codes to determine an initial read phase and a final read phase for each integration phase of the detector. The initial read phase is the one situated before the corresponding integration phase. The final read phase is the one situated after the corresponding integration phase. The memory 21 has a zone 34 comprising instruction codes to carry out a measurement, for each integration phase, of the latent charges present in the detector at the corresponding initial read phase.

The memory 21 has a zone 35 comprising instruction codes to produce a lag image from measured charges transmitted to the control logic unit at each phase of the initial read operation. The memory 21 has a zone 36 comprising instruction codes to determine an offset image at each lag image.

The memory 21 has a zone 37 comprising instruction codes to transmit the signals coming from the integration phase at the corresponding final read phase to the control logic unit. This final read phase is the phase for discharging the photodiodes 18. The control logic unit converts the signals received into a raw image comprising artifacts due to the lag image and by the noise.

The memory 21 has a zone 38 comprising instruction codes to eliminate the offset image from the lag image. The memory 21 has a zone 39 comprising instruction codes to eliminate the new lag image given by the instruction codes of the zone 38 from the raw image.

The memory 21 has a zone 40 comprising instruction codes to apply an existing noise-processing algorithm capable of eliminating the noise present in the raw image.

The invention corrects the problem caused by the charges retained by the amorphous silicon from one acquisition mode to another. The variation of the integration time due to the variations in position of the tube and the rate of correction to be made in a given pixel is different for each pixel. Consequently, the algorithm of the invention can be applied pixel by pixel.

The invention thus enables a passage from a mode with a low rate of X-radiation to a mode with a high rate of X-radiation, with neither loss of image quality nor any erroneous image due to the lag image.

Figure 2:
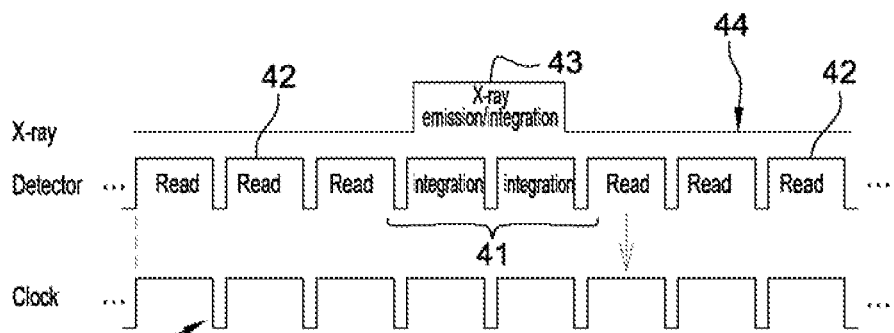
FIG. 2 is a graph showing the successive read and integration phases of the detector.

FIG. 2 is a graph showing the different successive read and integration phases of the detector. The detector has two possible types of phases, an integration phase 41 to detect the incoming photons emitted by the X-ray source tube and a read phase 42 to read the pixels and obtain the image.

The X-ray tube emits X-rays at different phases of emission 43. The emission signal 44 of the different emission phases 43 of the tube is determined as a function of the radiology examination to be undertaken. The control logic unit places the different integration phases of the detector in concordance with the emission signal 44 of the X-ray tube. Between two integration phases, the detector comprises read phases 42. The control logic unit places the different successive phases of the detector in concordance with the clock signal 45.

In the example of FIG. 2, only one integration phase 41 of the detector is shown. A read phase 42 is equal to a clock period. An integration phase 41 is equal to N clock periods, N being an integer greater than zero. When the detector is not in an integration phase 41, it is in a read phase 42 and vice versa. The only read phase in which the detector transmits a signal to the control logic is the read phase 42 situated just after the integration phase 41.

In a preferred embodiment, the number N of clock periods of an integration phase is greater than at least two clock periods. This makes it possible to accumulate the totality of the X-rays emitted during a corresponding emission phase. Furthermore, in the invention, the time between two integration phases is greater than two clock periods so as to have at least one read period without X-rays.

The photodiodes of present-day amorphous silicon matrix flat-panel detectors comprise traps due to the nature of the silicon which is not pure. In other words, these traps are silicon impurities. These traps get filled through X-ray excitation and are then emptied with relatively big time constants, spontaneously over several minutes. Consequently, in imaging sequences with high exposure, the detector may retain a lag image that decays with time as and when the traps get emptied.

Although it may happen that this image lag poses no problem in certain imaging sequences, it may be a particular source of problems for example in the event of the use of relatively low-intensity radiation after high-intensity radiation exposures. Or in the case of vascular imaging where radiology images are acquired in the relatively short times of a few seconds, the lag image, although it is a decaying image, may have pixel signal levels comparable to the levels produced by the next exposure.

To resolve this problem of lag, the control logic unit applies the correction algorithm of the invention to the detector of FIG. 2. The application of this correction algorithm is shown in FIG. 3.

Figure 3:
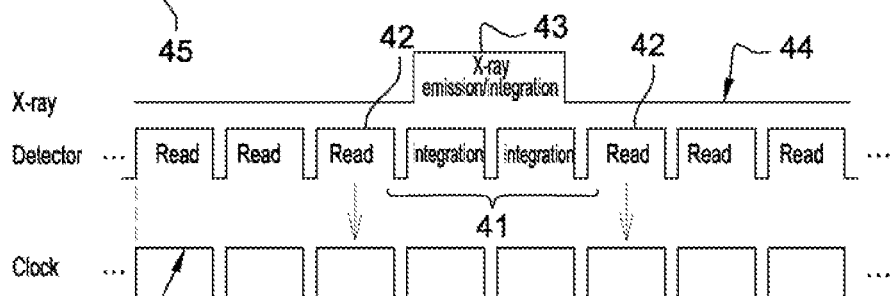
FIG. 3 is a graph showing the phases of latent charge measurement and image acquisition of the detector according to the invention.

FIG. 3 is a graph showing the different successive phases of reading and integration of the detector of the invention. For each integration phase, the control logic unit determines an initial read phase and a final read phase. In the example of FIG. 3, a single integration phase 41 of the detector is shown, it being known that the other integration phases of the detector are processed in the same way.

For the integration phase 41, the control logic unit determines the initial read phase 42 giving the lag image and the final read phase 42 giving the acquired image. To determine the lag image of the initial read phase 42 of the detector, the control logic unit measures the charges present in the traps of the photodiodes of the detector. The control logic unit determines the lag image from the lag charges measured in the last read period before the integration period. To obtain an artifact-free acquired image enabling improved diagnosis, the control logic unit subtracts the lag image from the acquired image.

Figure 4:
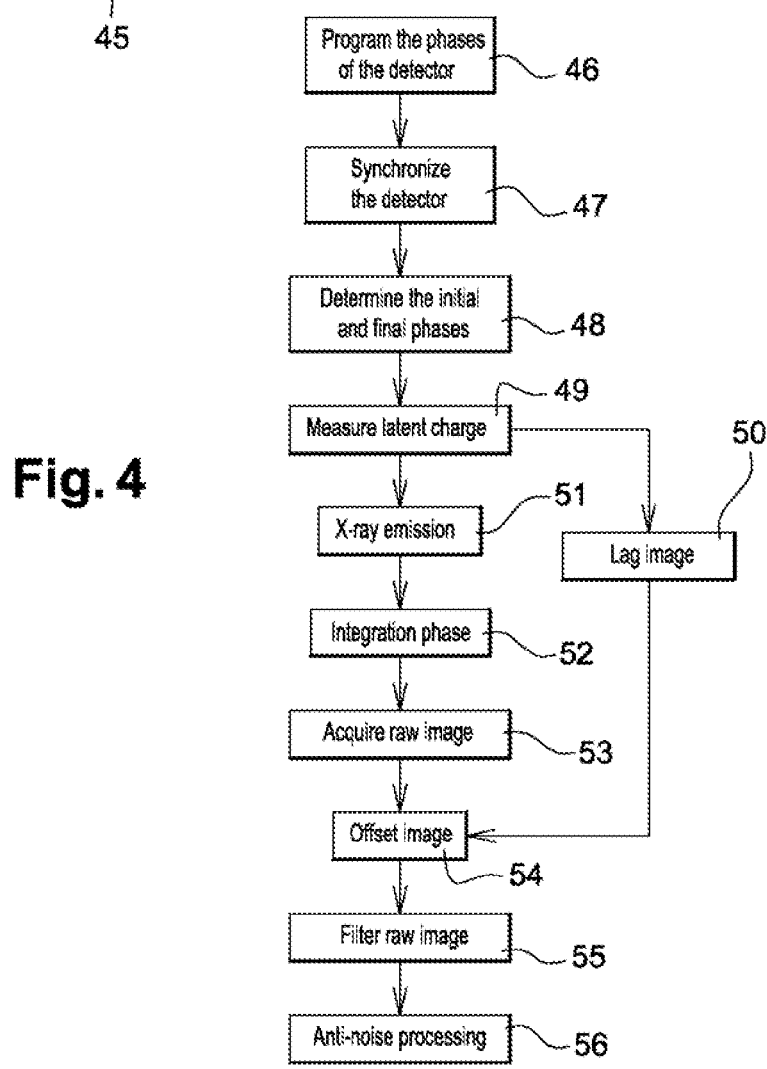
FIG. 4 illustrates means implementing the method of the invention.

FIG. 4 illustrates means implementing the method of the invention. FIG. 4 shows a preliminary step 46 in which the control logic unit determines the X-ray transmission signal as a function of the radiology examination to be undertaken. The control logic unit secures or locks the integration phases of the detector to the X-ray emission phases of the emission signal. Between two integration phases, the detector comprises read phases.

In the step 47, the control logic unit synchronizes the phases of the detector with the clock signal. In the step 48, the control logic unit determines an initial read phase and a final read phase for each integration phase.

At the step 49, the control logic unit measures, at each initial read phase, the latent charges present in the photodiodes of the detector. This measurement can be done using a sensor or any other means capable of making measurements of charges. At the step 50, the detector transmits the charges measured to the control logic unit. From these charges, the control logic unit determines a lag image.

At the step 51, the tube emits X-rays at a predetermined emission phase. At the step 52, the detector detects the X-rays emitted at a corresponding integration phase, in cumulating them during this integration phase. At the step 53, the detector, at the final phase of the corresponding integration phase, transmits the charges accumulated at said integration phase to the control logic unit. The control logic unit determines a raw image from the cumulated charges.

At the step 54, the control logic unit determines an offset image of the lag image. This offset image is determined because the lag image obtained at the initial read phase cannot be directly subtracted from the raw image obtained at the final read phase. This offset image is prompted by the detector itself and the associated circuits. It is obtained by performing an acquisition during a read phase without X-ray emission during a very short lapse of time. This period of time is far smaller than the duration of a read phase.

The control logic unit subtracts the offset image from the lag image. The subtraction is used to obtain a lag image corresponding to an integration clock period.

At the step 55, the control logic unit eliminates the artifacts due by to the lag image from the raw image. To do this, the control logic unit multiplies the lag image by the number (N+1) to correct the lag image of the raw image. The number N corresponds to the integration time of the integration phase. Raw image=(raw image−offset(N))−(N+1)*(the lag image−offset(0)).

The control logic unit considers N+1 to be equal to the integration time. This consideration is due to the fact that, in a read phase, the time needed to read a pixel is very small as compared with the clock period needed to read the detector in its entirety. When the pixel is not in this small read phase, it is in the integration phase. Consequently, when it is said that there is no integration, this is true at the level of the detector which is not in an integration phase but not at the level of the pixel where there is approximately one integration clock period. Consequently, the control logic unit counts one additional clock period to have the cumulated value of the totality of the integration phase.

A lag image is removed from each acquired raw image. This lag image is different for each integration phase of the detector.

At the step 56, the control logic unit applies a noise-processing algorithm to the raw image. This noise-processing algorithm can be applied directly to the raw image or to lag images. The noise-processing algorithm is any type of noise-processing algorithm that exists in the prior art.

In a first preferred example, the control logic unit applies the noise-processing algorithm to lag images. These lag images may be provided by at least two successive read phases situated before the integration phase. In this case, the control logic unit considers the lag image that has to be eliminated from the raw image to be the average of the two determined lag images.

In a second preferred example, the control logic unit applies the noise-processing algorithm to the raw image.

Embodiments of the present invention can be used to make a real-time correction of the latent charges in all the images of an exposure sequence, in implementing a measurement of the latent charges and not a correction model.

The use of charge measurement enables the direct correction of the lag image in the acquisition without using a model.

The invention also makes it possible to obtain an average of several lag images in order to reduce the noise. The invention also enables the direct processing of the lag image to reduce the noise.

What is claimed is:

1. A method for the real-time correction of latent charges in a detector of an X-ray apparatus, the method comprising:
    determining successive read and integration phases of the detector;
    corresponding the successive read and integration phases of the detector with a clock signal;
    exposing a patient's body to radiation produced by the X-ray apparatus;
    obtaining, through each final read phase situated just after said integration phase of the detector, a raw image representing an internal structure of the body;
    determining, for each integration phase; an initial read phase situated just before said integration phase;
    measuring, for each integration phase, the charges present in the detector at the corresponding initial read phase;
    producing a lag image from the latent charges measured in the initial read phase;
    obtaining an offset image during a read phase without X-ray emission;
    subtracting the offset image from the lag image; and
    eliminating artifacts due to the lag image from the raw image.

2. A method according to claim 1, wherein
    one read phase of the detector is equal to one clock period and one integration phase is equal to N clock periods, N being a positive integer, and
    the number N of clock periods for one integration phase is equal to at least two clock periods.

3. A method according to claim 1, further comprising:
    corresponding the integration phases of the detector with emission phases of an X-ray tube of the apparatus, according to the radiology examination to be made.

4. A method according to claim 1, wherein
    the duration of the phases of integration of the detector is determined as a function of the desired rate of correction of the raw image.

5. A method according to claim 1, wherein the time between two integration phases is greater than two clock periods.

6. A method according to claim 1, further comprising:
    applying a noise-processing algorithm to at least two lag images produced from two read phases situated just for the corresponding integration phase.

7. A method according to claim 1, further comprising:
    applying a noise-processing algorithm directly to the raw image.

* * * * *

UNITED STATES PATENT AND TRADEMARK OFFICE
CERTIFICATE OF CORRECTION

| | | |
|---|---|---|
| PATENT NO. | : 7,792,251 B2 | |
| APPLICATION NO. | : 12/055085 | |
| DATED | : September 7, 2010 | |
| INVENTOR(S) | : Bacher et al. | |

It is certified that error appears in the above-identified patent and that said Letters Patent is hereby corrected as shown below:

In Column 7, Line 12, delete "by to" and insert -- to --, therefor.

In Column 8, Line 17, in Claim 1, delete "phase;" and insert -- phase, --, therefor.

Signed and Sealed this
Eighth Day of March, 2011

David J. Kappos
*Director of the United States Patent and Trademark Office*